United States Patent
Gu et al.

(10) Patent No.: US 10,700,548 B2
(45) Date of Patent: Jun. 30, 2020

(54) POWER SUPPLY SYSTEM AND METHOD

(71) Applicant: INSPUR ELECTRONIC INFORMATION INDUSTRY CO., LTD., Jinan, Shandong (CN)

(72) Inventors: Junjie Gu, Shandong (CN); Jixu Che, Shandong (CN)

(73) Assignee: INSPUR ELECTRONIC INFORMATION INDUSTRY CO., LTD., Jinan, Shandong (CN)

( * ) Notice: Subject to any disclaimer, the term of this patent is extended or adjusted under 35 U.S.C. 154(b) by 27 days.

(21) Appl. No.: 16/097,151

(22) PCT Filed: Jul. 20, 2017

(86) PCT No.: PCT/CN2017/093616
§ 371 (c)(1),
(2) Date: Oct. 26, 2018

(87) PCT Pub. No.: WO2018/028409
PCT Pub. Date: Feb. 15, 2018

(65) Prior Publication Data
US 2019/0097455 A1 Mar. 28, 2019

(30) Foreign Application Priority Data

Aug. 10, 2016 (CN) .......................... 2016 1 0650162

(51) Int. Cl.
*G06F 1/26* (2006.01)
*G06F 11/20* (2006.01)
(Continued)

(52) U.S. Cl.
CPC .............. *H02J 9/061* (2013.01); *G06F 1/263* (2013.01); *G06F 1/266* (2013.01); *G06F 1/28* (2013.01);
(Continued)

(58) Field of Classification Search
CPC ... H02J 9/061; H02J 9/06; H02J 9/068; G06F 1/263; G06F 1/28; G06F 1/30;
(Continued)

(56) References Cited

U.S. PATENT DOCUMENTS

| 2004/0165324 | A1 | 8/2004 | Wiedemuth et al. |
| 2011/0222258 | A1* | 9/2011 | Malik .................. H02J 1/06 361/807 |

(Continued)

FOREIGN PATENT DOCUMENTS

| CN | 1476140 A | 2/2004 |
| CN | 102662453 A | 9/2012 |

(Continued)

OTHER PUBLICATIONS

The 1st Office Action dated Apr. 4, 2018 for Chinese Application No. 201610650162.9.

(Continued)

*Primary Examiner* — Robert L Deberadinis
(74) *Attorney, Agent, or Firm* — Yue (Robert) Xue; Apex Attorneys at Law, LLP

(57) ABSTRACT

A power supply system and a power supply method are provided. At least two power supply units are arranged in a power supply cabinet, each of the power supply units includes a main input port and a backup input port. The power supply units are divided into a first power supply group and a second power supply group. The first input power supply is connected to the main input port of each of the power supply units in the first power supply group and the backup input port of each of the power supply units in the second power supply group. The second input power supply is connected to the backup input port of each of the (Continued)

power supply units in the first power supply group and the main input port of each of the power supply units in the second power supply group.

14 Claims, 6 Drawing Sheets

(51) Int. Cl.
*H02J 9/06* (2006.01)
*G06F 1/30* (2006.01)
*G06F 1/28* (2006.01)
*H02B 1/30* (2006.01)

(52) U.S. Cl.
CPC ............ *G06F 1/30* (2013.01); *G06F 11/2015* (2013.01); *H02B 1/30* (2013.01); *H02J 9/06* (2013.01); *G06F 2201/85* (2013.01); *H02J 9/068* (2020.01)

(58) Field of Classification Search
CPC .... G06F 11/2015; G06F 2201/85; G06F 1/26; G06F 11/20; H02B 1/30
See application file for complete search history.

(56) References Cited

U.S. PATENT DOCUMENTS

| | | | |
|---|---|---|---|
| 2014/0054957 A1* | 2/2014 | Bellis | H02J 1/108 307/9.1 |
| 2018/0131166 A1 | 5/2018 | Emert et al. | |

FOREIGN PATENT DOCUMENTS

| | | |
|---|---|---|
| CN | 203911574 U | 10/2014 |
| CN | 104199534 | 12/2014 |
| CN | 104866057 A | 8/2015 |
| CN | 105305600 A | 2/2016 |
| CN | 106208349 A | 12/2016 |
| WO | 2016025575 A1 | 2/2016 |

OTHER PUBLICATIONS

International Search Report for PCT/CN2017/093616 dated Oct. 18, 2017, ISA/CN.

* cited by examiner

POWER SUPPLY SYSTEM AND METHOD

This application is the national phase of International Patent Application No. PCT/CN2017/093616, titled "POWER SUPPLY SYSTEM AND METHOD", filed on Jul. 20, 2017, which claims the priority to Chinese Patent Application No. 201610650162.9, titled "POWER SUPPLY SYSTEM AND METHOD", filed on Aug. 10, 2016 with the Chinese Patent Office, both of which are incorporated herein by reference in their entireties.

FIELD

The present disclosure relates to the technical field of electronic circuits, and in particular to a power supply system and a power supply method.

BACKGROUND

With the continuous development of the internet, data centers are continuously improved both in number and scale. The data center is used to provide information services for terminals, which plays a very important role in network applications. Therefore, there is a high requirement on security, continuity and reliability of a power supply system for the data center.

At present, a device to be powered is generally powered in a redundant manner with a configuration of a main input power supply and a backup input power supply. The main input power supply and the backup input power supply are connected to a control switch, which is connected to each power supply unit (PSU) in a power supply cabinet. The power supply cabinet is used to supply operating voltage for the device to be powered. In a case where the main input power supply operates normally, the control switch controls to supply power to the power supply group using the main input power supply, and the backup input power supply is in an offline state. In a case where the main input power supply operates abnormally, the control switch controls to stop supplying power to the power supply cabinet using the main input power supply and in turn supply power to the power supply cabinet using the backup input power supply. It can be seen that the backup input power supply is used to supply power to the power supply cabinet only in a case where the main input power supply operates abnormally, otherwise, the backup input power supply is always in the offline state. Therefore, there is an imbalance between the power supplies of the two input power supplies.

Technical Problem

A power supply system and a power supply method are provided according to the embodiments of the present disclosure, to achieve a balance between the power supplies of the two input power supplies.

Solution to the Problem

Technical Solution

In a first aspect, a power supply system is provided according to an embodiment of the present disclosure, which includes: a first input power supply, a second input power supply and a power supply cabinet.

The power supply cabinet includes at least two power supply units, and the at least two power supply units are divided into a first power supply group and a second power supply group.

Each of the at least two power supply units includes a main input port and a backup input port.

The first input power supply is connected to the main input port of each of the power supply units in the first power supply group and the backup input port of each of the power supply units in the second power supply group. The second input power supply is connected to the backup input port of each of the power supply units in the first power supply group and the main input port of each of the power supply units in the second power supply group.

In a case where the first input power supply and the second input power supply operate normally, the power supply cabinet is configured to receive power supply voltages supplied by the first input power supply and the second input power supply through the main input ports of all of the power supply units, and supply power to an external device to be powered using the power supply voltages.

In an embodiment of the present disclosure, the power supply cabinet further includes: a power supply state monitoring unit.

The power supply state monitoring unit is connected to the first input power supply, the second input power supply and each of the at least two power supply units in the power supply cabinet. The power supply state monitoring unit is configured to: control each of the power supply units in the first power supply group to receive the power supply voltage through the backup input port and control each of the power supply units in the second power supply group to receive the power supply voltage through the main input port, in a case of monitoring that the first input power supply operates abnormally; and control each of the power supply units in the first power supply group to receive the power supply voltage through the main input port and control each of the power supply units in the second power supply group to receive the power supply voltage through the backup input port, in a case of monitoring that the second input power supply operates abnormally.

In an embodiment of the present disclosure, the power supply cabinet further includes a power supply distributing unit.

The power supply distributing unit is connected to each of the at least two power supply units. In a case where the first input power supply supplies a power supply voltage with at least two phases, the power supply distributing unit is connected to the first input power supply, and is configured to distribute the power supply voltage supplied by the first input power supply into at least two single-phase voltages. In a case where the second input power supply supplies a power supply voltage with at least two phases, the power supply distributing unit is connected to the second input power supply, and is configured to distribute the power supply voltage supplied by the second input power supply into at least two single-phase voltages.

In an embodiment of the present disclosure, the number of the power supply units in the power supply cabinet is related to the number of phases of a power supply voltage supplied by each of the first input power supply and the second input power supply.

In a case where the first input power supply and the second input power supply supplies power supply voltages with the same number of phases, the number of the power supply units in the power supply cabinet is at least twice the number of phases of the power supply voltage.

In a case where one of the first input power supply and the second input power supply supplies a single-phase voltage, and the other one of the first input power supply and the second input power supply supplies a two-phase voltage, the number of the power supply units in the power supply cabinet is a multiple of four.

In a case where one of the first input power supply and the second input power supply supplies a single-phase voltage, and the other one of the first input power supply and the second input power supply supplies a three-phase voltage, the number of the power supply units in the power supply cabinet is a multiple of six.

In a case where one of the first input power supply and the second input power supply supplies a two-phase voltage, and the other one of the first input power supply and the second input power supply supplies a three-phase voltage, the number of power supply units in the power supply cabinet is a multiple of twelve.

In an embodiment of the present disclosure, the at least two single-phase voltages distributed by the power supply distributing unit are supplied to the at least two power supply units through input ports of the same port type.

In an embodiment of the present disclosure, the number of the power supply units is greater than the number of power supply units required by a device to be powered for a normal operation.

In a second aspect, a power supply method is further provided according to an embodiment of the present disclosure, which includes:
  arranging at least two power supply units in a power supply cabinet, where the at least two power supply units are divided into a first power supply group and a second power supply group, and each of the at least two power supply units includes a main input port and a backup input port;
  connecting a first input power supply to the main input port of each of the power supply units in the first power supply group and to the backup input port of each of the power supply units in the second power supply group;
  connecting a second input power supply to the backup input port of each of the power supply units in the first power supply group and the main input port of each of the power supply units in the second power supply group;
  controlling the power supply cabinet to receive power supply voltages supplied by the first input power supply and the second input power supply through the main input ports of all of the power supply units, in a case where it is determined that the first input power supply and the second input power supply operate normally; and
  supplying power to an external device to be powered using the power supply voltages.

In an embodiment of the present disclosure, the power supply method further includes:
  controlling each of the power supply units in the first power supply group to receive the power supply voltage through the backup input port and controlling each of the power supply units in the second power supply group to receive the power supply voltage through the main input port, in a case where it is monitored that the first input power supply operates abnormally; and
  controlling each of the power supply units in the first power supply group to receive the power supply voltage through the main input port and controlling each of the power supply units in the second power supply group to receive the power supply voltage through the backup input port, in a case where it is monitored that the second input power supply operates abnormally.

In an embodiment of the present disclosure, in a case where the power supply cabinet further includes a power supply distributing unit, the power supply method further includes:
  connecting the power supply distributing unit to each of the at least two power supply units;
  connecting the power supply distributing unit to the first input power supply and distributing, by the power supply distributing unit, a power supply voltage supplied by the first input power supply into at least two single-phase voltages, in a case where it is determined that the first input power supply supplies a power supply voltage with at least two phases; and
  connecting the power supply distributing unit to the second input power supply and distributing, by the power supply distributing unit, a power supply voltage supplied by the second input power supply into at least two single-phase voltages, in a case where it is determined that the second input power supply supplies a power supply voltage with at least two phases.

In an embodiment of the present disclosure, the arranging the at least two power supply units in the power supply cabinet includes:
  arranging, in the power supply cabinet, power supply units with the number related to the number of phases of a power supply voltage supplied by each of the first input power supply and the second input power supply,
  in a case where the first input power supply and the second input power supply supplies power supplies with the same number of phases, the number of the power supply units arranged in the power supply cabinet is at least twice the number of phases of the power supply voltage;
  in a case where one of the first input power supply and the second input power supply supplies a single-phase voltage, and the other one of the first input power supply and the second input power supply supplies a two-phase voltage, the number of the power supply units arranged in the power supply cabinet is a multiple of four;
  in a case where one of the first input power supply and the second input power supply supplies a single-phase voltage, and the other one of the first input power supply and the second input power supply supplies a three-phase voltage, the number of the power supply units arranged in the power supply cabinet is a multiple of six; and
  in a case where one of the first input power supply and the second input power supply supplies a two-phase voltage, and the other one of the first input power supply and the second input power supply supplies a three-phase voltage, the number of power supply units arranged in the power supply cabinet is a multiple of twelve.

In an embodiment of the present disclosure, the connecting the power supply distributing unit to each of the at least two power supply units includes: supplying the at least two single-phase voltages distributed by the power supply distributing unit to the at least two power supply units through input ports of the same port type.

In an embodiment of the present disclosure, the arranging the at least two power supply units in the power supply cabinet includes: arranging, in the power supply cabinet, power supply units with the number greater than the number of power supply units required by a device to be powered for a normal operation.

Advantageous Effect of the Disclosure

Advantageous Effect

It can be seen that a power supply system and a power supply method are provided according to the embodiments of the present disclosure. At least two power supply units are arranged in a power supply cabinet, and each of the power supply units includes a main input port and a backup input port. The power supply units are divided into two power supply groups, that is, a first power supply group and a second power supply group. The first input power supply is connected to the main input port of each of the power supply units in the first power supply group and the backup input port of each of the power supply units in the second power supply group. The second input power supply is connected to the backup input port of each of the power supply units in the first power supply group and the main input port of each of the power supply units in the second power supply group. In a case where it is determined that the first input power supply and the second input power supply operate normally, the power supply cabinet is controlled to receive power supply voltages supplied by the first input power supply and the second input power supply through the main input ports of all of the power supply units, and supply power to an external device to be powered using the power supply voltages. In a case where there are two input power supplies, each of the power supply units has two input ports. In a case where the two input power supplies operate normally, all of the power supply units are supplied by the two input power supplies, such that both the two input power supplies are in a power supply state, thereby achieving the balance between the power supplies of the two input power supplies.

BRIEF DESCRIPTION OF THE DRAWINGS

Description of the Drawings

In order to more clearly illustrate technical solutions according to the present disclosure or the conventional technology, the drawings to be used in the description of the embodiments or the conventional technology are described briefly hereinafter. It is apparent that the drawings in the following description only illustrate some embodiments of the present disclosure. For those skilled in the art, other drawings may be obtained according to these drawings without any creative work.

Figure 1:
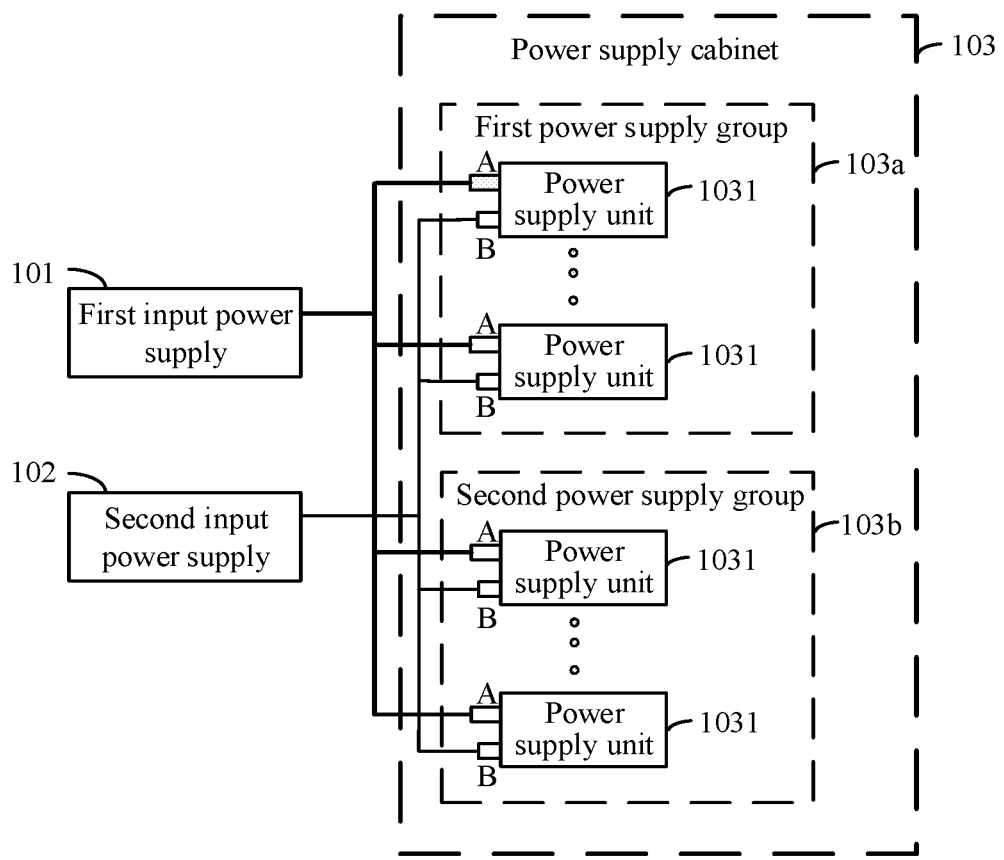
Figure 2:
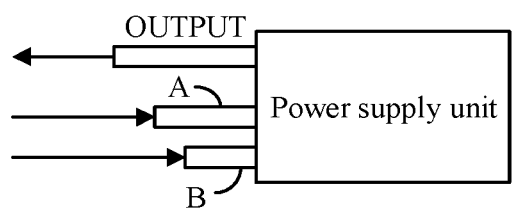
Figure 3:
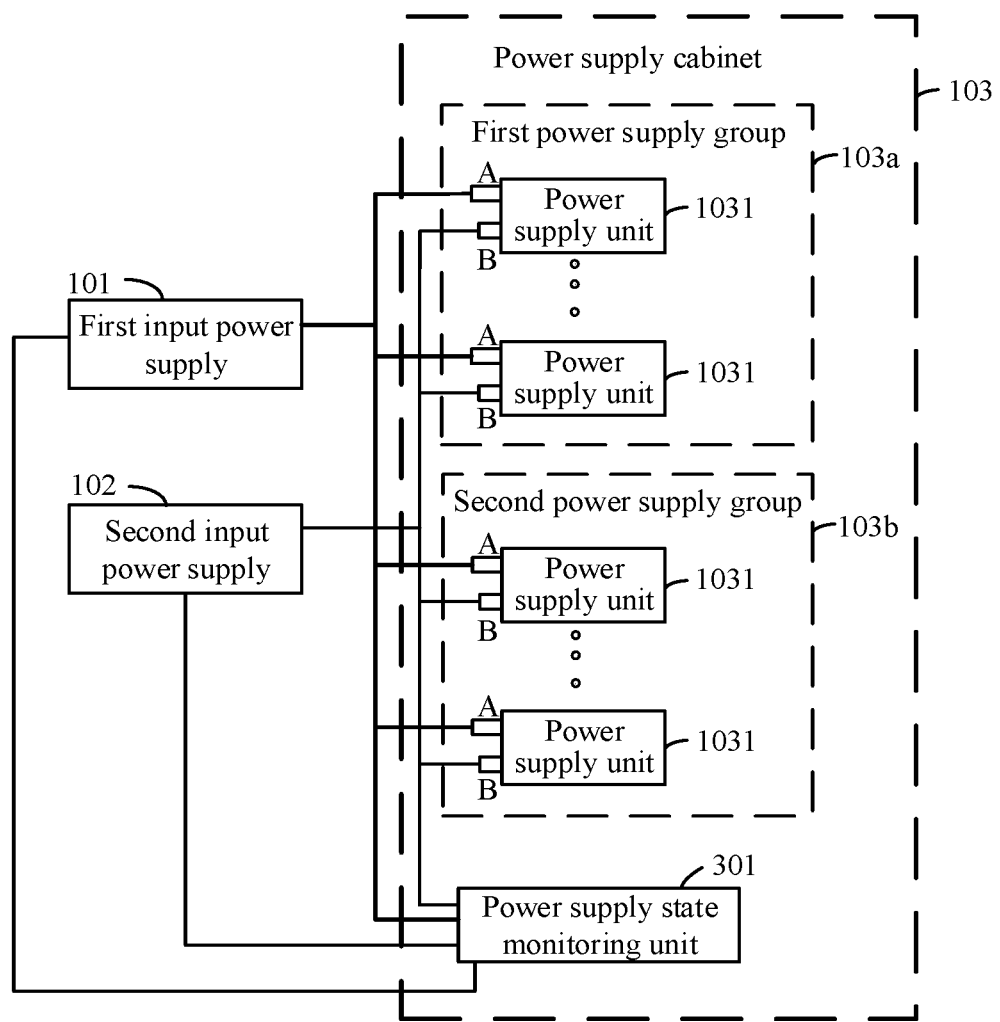
Figure 4:
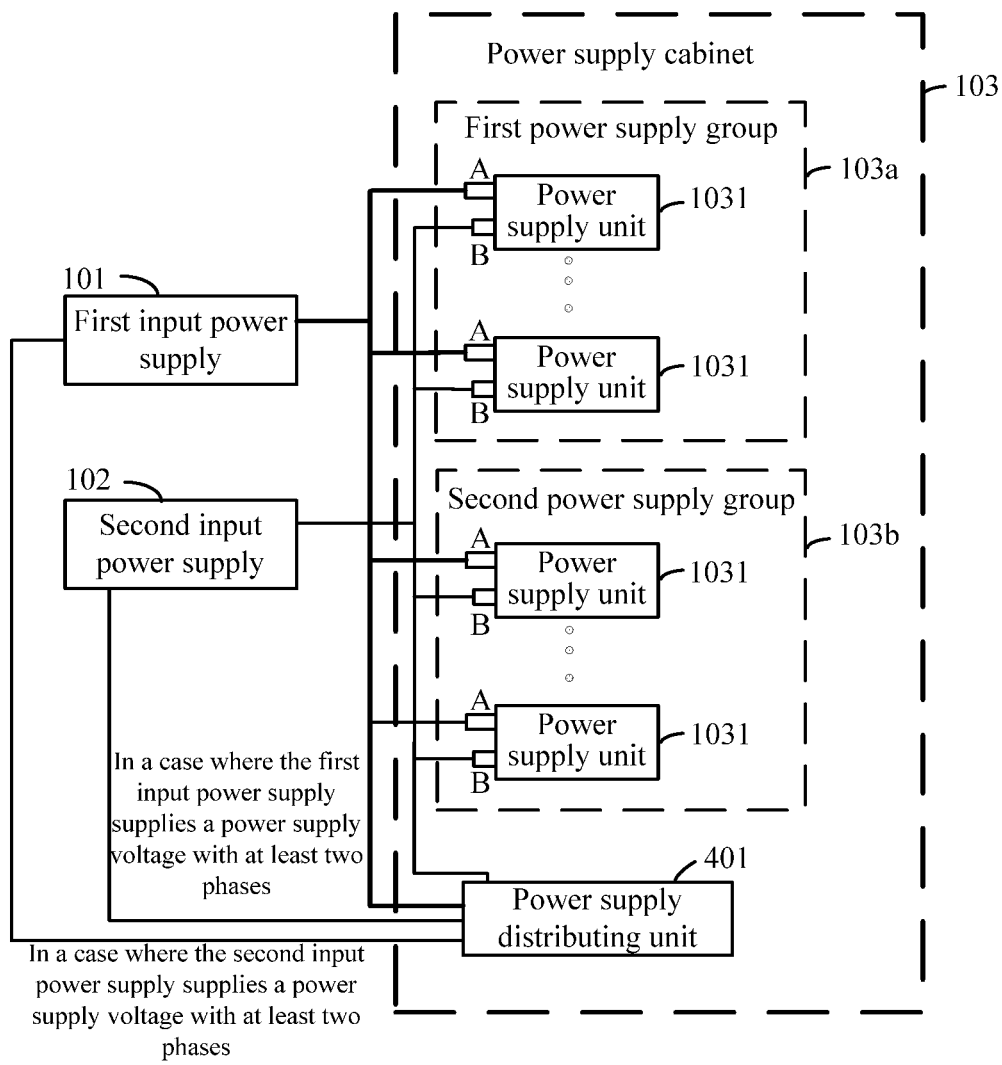
Figure 5:
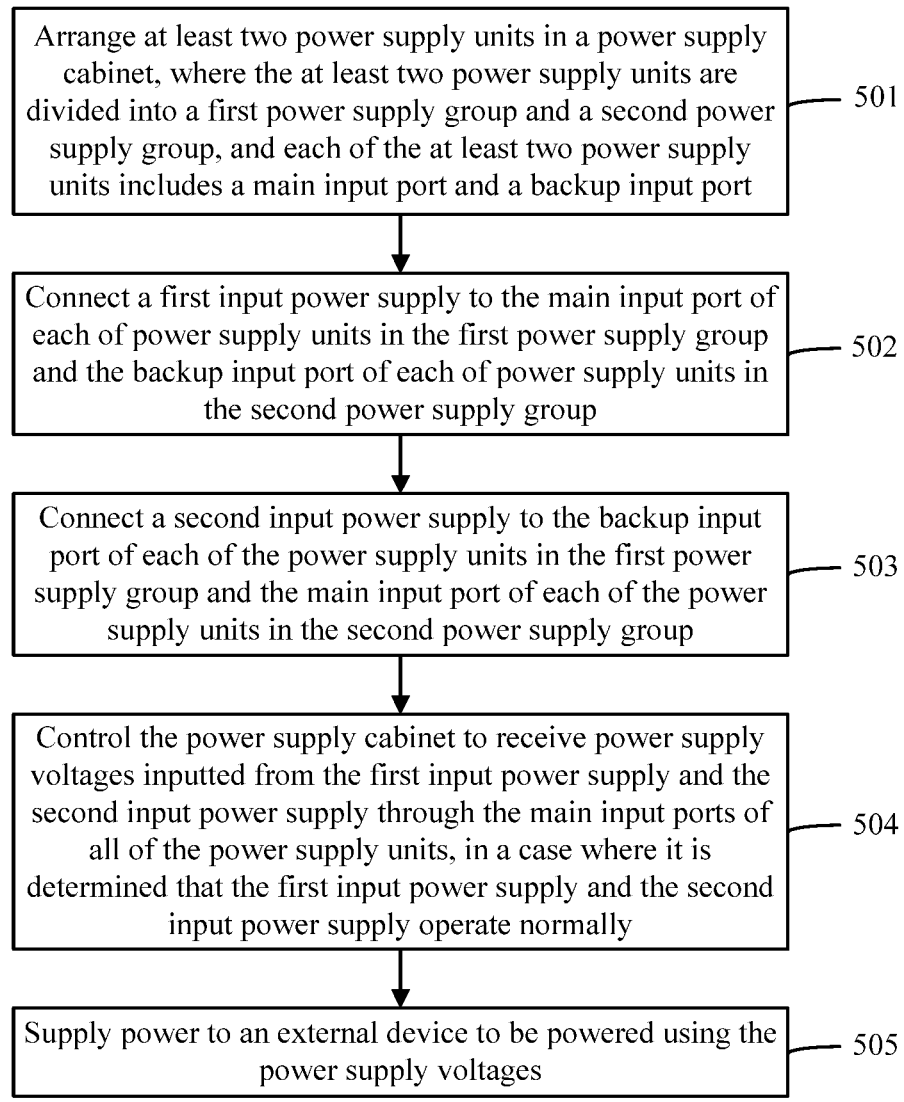
Figure 6:
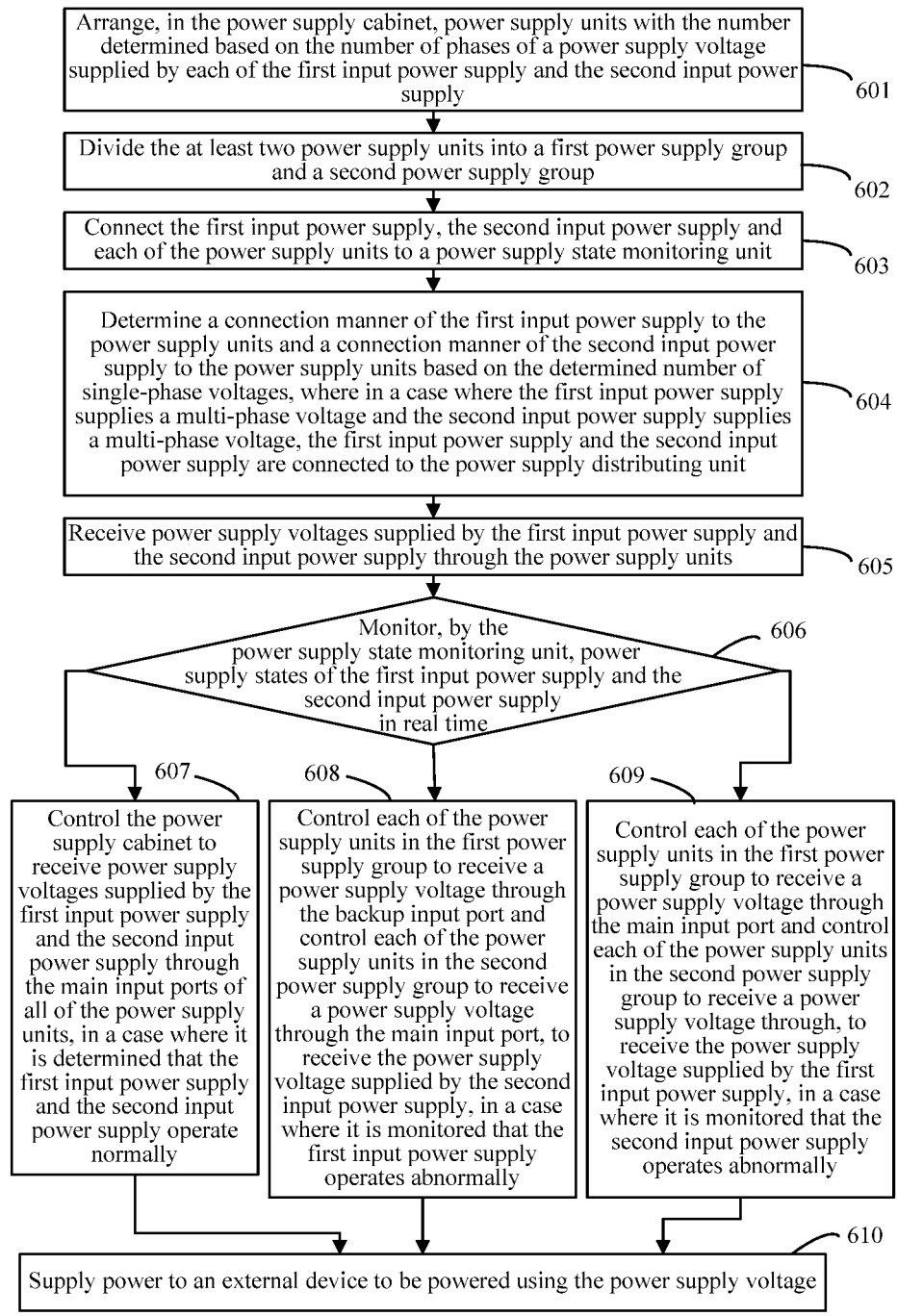
Figure 7:
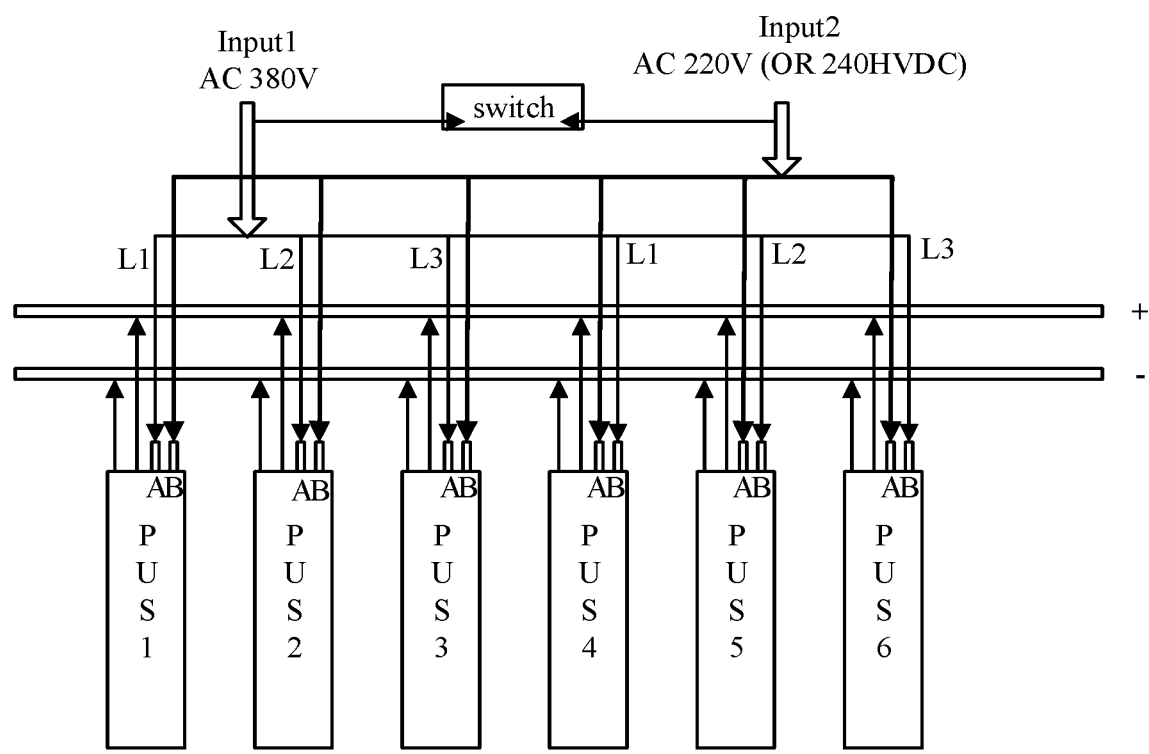

FIG. 1 is a schematic diagram of a structure of a power supply system according to an embodiment of the present disclosure;

FIG. 2 is a schematic diagram of a power supply unit having two input ports according to an embodiment of the present disclosure;

FIG. 3 is a schematic diagram of a structure of a power supply system according to another embodiment of the present disclosure;

FIG. 4 is a schematic diagram of a structure of a power supply system according to another embodiment of the present disclosure;

FIG. 5 is a flowchart of a power supply method according to an embodiment of the present disclosure;

FIG. 6 is a flowchart of a power supply method according to another embodiment of the present disclosure; and FIG. 7 is a schematic diagram showing power distribution in a power supply cabinet according to an embodiment of the present disclosure.

EMBODIMENTS OF THE DISCLOSURE

Embodiments of the Present Disclosure

For making the objects, technical solutions and advantages of the embodiments of the present disclosure more clear, the technical solutions in the embodiments of the present disclosure are described clearly and completely hereinafter in conjunction with the drawings in the embodiments of the present disclosure. The described embodiments are some, rather than all of the embodiments of the present disclosure. Based on the embodiments of the present disclosure, all other embodiments, made by those skilled in the art without any creative efforts, should fall into the protection scope of the present disclosure.

As shown in FIG. 1, a power supply system is provided according to an embodiment of the present disclosure, which includes: a first input power supply 101, a second input power supply 102 and a power supply cabinet 103.

The power supply cabinet 103 includes at least two power supply units 1031, and the at least two power supply units 1031 are divided into a first power supply group 103*a* and a second power supply group 103*b*.

For example, the first input power supply may be one of a three-phase 380V alternating current power supply, a 220V alternating current power supply and a 240V high-voltage direct current power supply, and the second input power supply may be one of a three-phase 380V alternating current power supply, a 220V alternating current power supply and a 240V high-voltage direct current power supply. AC represents an alternating current and DC represents a direct current, the combination manner of the two input power supplies may be one of the following: AC+AC, AC+DC and DC+DC.

The power supply cabinet includes at least two power supply units. The number of the power supply units may be determined according to a requirement on the power supply to a device to be powered. In a case where six power supply units are arranged according to the requirement on the power supply to the device to be powered, and the power supply units are divided into two groups, that is, the first power supply group and the second power supply group, the first power supply group includes three power supply units, and the second power supply group includes three power supply units.

Each of the power supply units 1031 includes a main input port A and a backup input port B.

As shown in FIG. 2, each of the power supply units includes two input ports, that is, the main input port and the backup input port, for receiving power supply voltages supplied by the first input power supply and the second input power supply.

The first input power supply 101 is connected to the main input port A of each of the power supply units 1031 in the first power supply group 103*a* and the backup input port B of each of the power supply units 1031 in the second power supply group 103*b*. The second input power supply 102 is connected to the backup input port B of each of the power supply units 1031 in the first power supply group 103*a* and the main input port of each of the power supply units 1031 in the second power supply group 103*b*.

For example, in a case where six power supply units are arranged, the first input power supply is a 220V alternating current power supply, and the second input power supply is a 240V direct current power supply, the first power supply group includes three power supply units, and the second power supply group includes three power supply units. The first input power supply, that is, the 220V alternating current power supply, is connected to the main input port of each of the three power supply units in the first power supply group and the backup input port of each of the three power supply units in the second power supply group. The second input power supply, that is, the 240V direct current power supply, is connected to the backup input port of each of the three power supply units in the first power supply group the main input port of each of the three power supply units in the second power supply group.

In a case where the first input power supply 101 and the second input power supply 102 operate normally, the power supply cabinet 103 is configured to receive power supply voltages supplied by the first input power supply 101 and the second input power supply 102 through the main input ports A of all of the power supply units 1031, and supply power to an external device to be powered using the power supply voltages.

For example, six power supply units are arranged, the first input power supply is a 220V alternating current power supply, and the second input power supply is a 240V direct current power supply, the first power supply group includes three power supply units, and the second power supply group includes three power supply units. In a case where the 220V alternating current power supply and the 240V direct current power supply operate normally, the power supply voltage supplied by the first input power supply is received by each of the power supply units in the first power supply group in the power supply cabinet through the main input port, and the power supply voltage supplied by the second input power supply is received by each of the power supply units in the second power supply group in the power supply cabinet through the main input port. The power supply cabinet supplies power to an external device to be powered using the power supply voltages received by the power supply units.

According to the above embodiment, at least two power supply units are arranged in the power supply cabinet, and each of the power supply units includes a main input port and a backup input port. The power supply units are divided into two power supply groups, that is, a first power supply group and a second power supply group. The first input power supply is connected to the main input port of each of the power supply units in the first power supply group and the backup input port of each of the power supply units in the second power supply group. The second input power supply is connected to the backup input port of each of the power supply units in the first power supply group and the main input port of each of the power supply units in the second power supply group. In a case where it is determined that the first input power supply and the second input power supply operate normally, the power supply cabinet is controlled to receive power supply voltages supplied by the first input power supply and the second input power supply through the main input ports of all of the power supply units, and supply power to an external device to be powered using the power supply voltages. In a case where there are two input power supplies, each of the power supply units has two input ports. In a case where the two input power supplies operate normally, all of the power supply units are powered by the two input power supplies, such that both the two input power supplies are in a power supply state, thereby achieving the balance between the power supplies of the two input power supplies.

In another embodiment of the present disclosure, as shown in FIG. 3, the power supply cabinet 103 further includes a power supply state monitoring unit 301.

The power supply state monitoring unit 301 is connected to the first input power supply 101, the second input power supply 102 and each of the power supply units 1031 in the power supply cabinet 103. The power supply state monitoring unit 301 is configured to: control each of the power supply units 1031 in the first power supply group 103a to receive the power supply voltage through the backup input port B and control each of the power supply units 1031 in the second power supply group 103b to receive the power supply voltage through the main input port A, in a case of monitoring that the first input power supply 101 operates abnormally; and control each of the power supply units 1031 in the first power supply group 103a to receive the power supply voltage through the main input port A and control each of the power supply units 1031 in the second power supply group 103b to receive the power supply voltage through the backup input port B, in a case of monitoring that the second input power supply 102 operates abnormally.

For example, six power supply units are arranged, the first input power supply is a 220V alternating current power supply, and the second input power supply is a 240V direct current power supply, the first power supply group includes three power supply units, and the second power supply group includes three power supply units. In a case of monitoring that the first input power supply, that is, the 220V alternating current power supply, operates abnormally, for example, the power supply voltage is unstable or the output of the power supply voltage is stopped, the power supply state monitoring unit is configured to control each of the three power supply units in the first power supply group to receive the power supply voltage through the backup input port and control each of the three power supply units in the second power supply group to receive the power supply voltage through the main input port. In a case of monitoring that the second input power supply, that is, the 240V direct current power supply, operates abnormally, for example, the power supply voltage is unstable or the output of the power supply voltage is stopped, the power supply state monitoring unit is configured to control each of the three power supply units in the first power supply group to receive the power supply voltage through the main input port and control each of the three power supply units in the second power supply group to receive the power supply voltage through the backup input port.

According to the above embodiment, even if one of the first input power supply and the second input power supply operates abnormally, all of the power supply units in the power supply cabinet are still powered normally by using the power supply voltage supplied by the other one of the first input power supply and the second input power supply. In this way, with the redundant power supply manner of using a configuration of two input power supplies, even if one of the two input power supplies operates abnormally, all of the power supply units in the power supply cabinet can be powered normally, thereby achieving a stable power supply to the power supply cabinet.

In another embodiment of the present disclosure, as shown in FIG. 4, the power supply cabinet 103 further includes a power supply distributing unit 401.

The power supply distributing unit 401 is connected to each of the at least two power supply units 1031 in the at least two power supply units 103. In a case where the first input power supply 101 supplies a power supply voltage with at least two phases, the power supply distributing unit 401 is connected to the first input power supply 101, and is configured to distribute the power supply voltage supplied by the first input power supply 101 into at least two single-phase voltages. In a case where the second input power supply 102 supplies a power supply voltage with at least two phases, the power supply distributing unit 401 is connected to the second input power supply 102, and is configured to distribute the power supply voltage supplied by the second input power supply 102 into at least two single-phase voltages.

In a case where the first input power supply or the second input power supply supplies a power supply voltage with at least two phases, the power supply voltage can not be directly supplied to the power supply units in the power supply cabinet, it is required to supply the power supply voltage to the power supply distributing unit for distributing the power supply voltage into at least two single-phase voltages. For example, in a case where the first input power supply supplies a three-phase 380V alternating voltage, it is required to connect the first input power supply to the power supply distributing unit, to distribute the three-phase 380V alternating voltage into three 220V single-phase voltages. In a case where the second input power supply supplies a three-phase 380V alternating voltage, it is required to connect the second input power supply to the power supply distributing unit, to distribute the three-phase 380V alternating voltage into three 220V single-phase voltages. In a case where one of the first input power supply and the second input power supply supplies a power supply voltage with at least two phases, it is required to arrange only one power distributing input port for connecting with the one of the first input power supply and the second input power supply supplying the power supply voltage with at least two phases. In a case where each of the first input power supply and the second input power supply supplies a power supply voltage with at least two phases, it is required to arrange two power distributing input ports for connecting with the first input power supply and the second input power supply.

According to the above embodiment, in a case where one of the first input power supply and the second input power supply supplies a power supply voltage with at least two phases, or each of the first input power supply and the second input power supply supplies a power supply voltage with at least two phases, it is required to connect at least one of the first input power supply and the second input power supply supplying a power supply voltage with at least two phases to the power supply distributing unit in the power supply cabinet, to distribute the power supply voltage with at least two phases into at least two single-phase voltages, such that the power supply cabinet may be adapted to server rooms in various power supplied manners, and it is unnecessary to arrange a separate power distributing cabinet, thereby improving the efficiency of deployment of the server rooms.

In another embodiment of the present disclosure, in a case where at least one of the first input power supply and the second input power supply supplies a power supply voltage with at least two phases, it is required to determine the number of the power supply units in the power supply cabinet based on the numbers of phases of the power supply voltage with at least two phases, to ensure that phase-missing does not occur during the power supply units are powered using the power supply voltage with at least two phases.

Specifically, the number of the power supply units 1031 in the power supply cabinet 103 is related to the number of phases of a power supply voltage supplied by each of the first input power supply 101 and the second input power supply 102.

In a case where the first input power supply 101 and the second input power supply 102 supply power supply voltage with the same number of phases, the number of the power supply units 1031 in the power supply cabinet 103 is at least twice the number of phases of the power supply voltage.

For example, the first input power supply is a single-phase 220V alternating current power supply, and the second input power supply is a single-phase 240V direct current power supply, the number of the power supply units in the power supply cabinet may be expressed by 2×2=4, or may be expressed by 3×2=6, and each of the single-phase voltages distributed from power supply voltages supplied by the first input power supply and the second input power supply can be supplied to a corresponding power supply unit. For example, the first input power supply supplies a two-phase voltage, and the second input power supply supplies a two-phase voltage, the number of the power supply units in the power supply cabinet may be expressed by 2×4=8, or may be expressed by 3×4=12. That is, the number of the power supply units in the power supply cabinet is at least twice the number of phases of the power supply voltage. In this way, it can be ensured that with a redundant configuration of the power supply units, each of the at least two single-phase voltages obtained by distributing the power supply voltage with at least two phases can be supplied to one power supply unit, thereby avoiding the phase-missing.

In a case where one of the first input power supply 101 and the second input power supply 102 supplies a single-phase voltage, and the other one of the first input power supply 101 and the second input power supply 102 supplies a two-phase voltage, the number of the power supply units 1031 in the power supply cabinet 103 is a multiple of four.

For example, in a case where one of the first input power supply and the second input power supply supplies a single-phase voltage, and the other one of the first input power supply and the second input power supply supplies a two-phase voltage, the number of the power supply units in the power supply cabinet may be 4, or may be expressed by 2×4=8. In this way, it can be ensured that with a redundant configuration of the power supply units, each of the at least two single-phase voltages obtained by distributing the power supply voltage with at least two phases can be supplied to one power supply unit, thereby avoiding the phase-missing.

In a case where one of the first input power supply 101 and the second input power supply 102 supplies a single-phase voltage, and the other one of the first input power supply 101 and the second input power supply 102 supplies a three-phase voltage, the number of the power supply units 1031 in the power supply cabinet 103 is a multiple of six.

For example, in a case where one of the first input power supply and the second input power supply supplies a single-phase voltage, the other one of the first input power supply and the second input power supply supplies a three-phase voltage, the number of the power supply units in the power supply cabinet may be 6, or may be expressed by 2×6=12. In this way, it can be ensured that with a redundant configuration of the power supply units, each of the at least two single-phase voltages obtained by distributing the power supply voltage with at least two phases can be supplied to one power supply unit, thereby avoiding the phase-missing.

In a case where one of the first input power supply 101 and the second input power supply 102 supplies a two-phase voltage, and the other one of the first input power supply 101 and the second input power supply 102 supplies a three single-phase voltage, the number of the power supply units 1031 in the power supply cabinet 103 is a multiple of twelve.

For example, in a case where one of the first input power supply and the second input power supply supplies a single-phase voltage, the other one of the first input power supply and the second input power supply supplies a three-phase voltage, the number of the power supply units in the power supply cabinet may be 6, or may be expressed by 2×6=12. In this way, it can be ensured that with a redundant configuration of the power supply units, each of the at least two single-phase voltages obtained by distributing the power supply voltage with at least two phases can be supplied to one power supply unit, thereby avoiding the phase-missing.

According to the above embodiment, in a case where at least one of the first input power supply and the second input power supply supplies a power supply voltage with at least two phases, it is required to determine the number of the power supply units in the power supply cabinet based on the number of phases of the power supply voltage, to ensure that with a redundant configuration of the power supply units, each of the at least two single-phase voltages obtained by distributing the power supply voltage with at least two phases can be supplied to one power supply unit, thereby avoiding the phase-missing, thus achieving the balance between the power supplies of the two input power supplies.

In another embodiment of the present disclosure, in order to achieve the balance between power supplies of the two input power supplies using the at least two single-phase voltages, the input ports of the power supply units receiving the at least two single-phase voltages have the same port type.

Specifically, the at least two single-phase voltages distributed by the power supply distributing unit are supplied to the power supply units through input ports of the same port type.

For example, the first input power supply supplies a three-phase 380V alternating voltage, the power supply cabinet includes six power supply units, the first power supply group includes three power supply units, and the second power supply group includes three power supply units, the three-phase 380V alternating voltage is supplied to the power supply distributing unit, and is distributed into three single-phase voltages L1, L2 and L3. In a case where the first input power supply operates normally, the obtained three single-phase voltages L1, L2 and L3 are respectively supplied to the main input ports of the three power supply units in the first power supply group and the backup input ports of the three power supply units in the second power supply group.

According to the above embodiment, the at least two single-phase voltages distributed by the power supply distributing unit are supplied to the power supply units through input ports of the same port type, thereby achieving the balance between the power supplies.

In another embodiment of the present disclosure, in order to achieve a normal operation of the device to be powered, it is required to ensure that there are a sufficient number of power supply units in the power supply cabinet to supply a required power supply voltage.

Specifically, the number of the power supply units is greater than the number of power supply units required by a device to be powered for a normal operation.

For example, in a case where four power supply units are required by the device to be powered for a normal operation, the number of the power supply units in the power supply cabinet is up to four to ensure that a supplied power supply voltage meets the requirement of the device to be powered for a normal operation.

According to the above embodiment, only number of power supply units in the power supply cabinet is up to a number of power supply units required by a device to be powered for a normal operation, can achieve the normal operation of the device to be powered.

Since the information interaction and the implementation processes between units in the apparatus are based on the same concept as the method embodiments of the present disclosure, one may referred to the description of the method embodiments of the present disclosure for the detailed description, which is not repeated here.

As shown in FIG. 5, a power supply method is further provided according to an embodiment of the present disclosure, which includes the following steps 501 to 505.

In step 501, at least two power supply units are arranged in a power supply cabinet. The at least two power supply units are divided into a first power supply group and a second power supply group, and each of the at least two power supply units includes a main input port and a backup input port.

In step 502, a first input power supply is connected to the main input port of each of the power supply units in the first power supply group and the backup input port of each of the power supply units in the second power supply group.

In step 503, the second input power supply is connected to the backup input port of each of the power supply units in the first power supply group and the main input port of each of the power supply units in the second power supply group.

In step 504, in a case where it is determined that the first input power supply and the second input power supply operate normally, the power supply cabinet is controlled to receive power supply voltages supplied by the first input power supply and the second input power supply through the main input ports of all of the power supply units.

In step 505, an external device to be powered is powered using the power supply voltages.

In another embodiment of the present disclosure, in order to monitor operating states of the first input power supply and the second input power supply in real time, a power supply state monitoring unit is arranged to monitor the operating states of the input power supplies in real time, and control, based on the monitored operating states of the input power supplies, the power supply units to perform a corresponding operation. Therefore, the method further includes: arranging the power supply state monitoring unit.

In a case of monitoring that the first input power supply operates abnormally, the power supply state monitoring unit controls each of the power supply units in the first power supply group to receive the power supply voltage through the backup input port and controls each of the power supply units in the second power supply group to receive the power supply voltage through the main input port.

In a case of monitoring that the second input power supply operates abnormally, the power supply state monitoring unit controls each of the power supply units in the first power supply group to receive the power supply voltage through the main input port and controls each of the power supply units in the second power supply group to receive the power supply voltage through the backup input port.

In another embodiment of the present disclosure, in order to cause the power supply cabinet to adapt to server rooms in various power supplied manners and reduce risks of failures in the server room, the power supply cabinet further includes a power supply distributing unit. Therefore, the method further includes:

connecting the power supply distributing unit to each of the at least two power supply units;

connecting the power supply distributing unit to the first input power supply and distributing, by the power supply distributing unit, a power supply voltage supplied by the first input power supply into at least two single-phase voltages, in a case where it is determined that the first input power supply supplies a power supply voltage with at least two phases; and connecting the power supply distributing unit to the second input power supply and distributing, by the power supply distributing unit, a power supply voltage supplied by the second input power supply into at least two single-phase voltages, in a case where it is determined that the second input power supply supplies a power supply voltage with at least two phases.

In an embodiment of the present disclosure, in a case where at least one of the first input power supply and the second input power supply supplies a power supply voltage with at least two phases, it is required to determine the number of the power supply units in the power supply cabinet based on the number of phases of the power supply voltage, to ensure that the phase-missing does not occur when the power supply units are powered using the power supply voltage with at least two phases.

The arranging the at least two power supply units in the power supply cabinet includes:

arranging, in the power supply cabinet, power supply units with the number related to the number of phases of a power supply voltage supplied by each of the first input power supply and the second input power supply.

In a case where the first input power supply and the second input power supply supplies power supply voltages with the same number of phases, the number of the power supply units arranged in the power supply cabinet is at least twice the number of phases of the power supply voltage.

In a case where one of the first input power supply and the second input power supply supplies a single-phase voltage, and the other one of the first input power supply and the second input power supply supplies a two-phase voltage, the number of the power supply units arranged in the power supply cabinet is a multiple of four.

In a case where one of the first input power supply and the second input power supply supplies a single-phase voltage, and the other one of the first input power supply and the second input power supply supplies a three-phase voltage, the number of power supply units arranged in the power supply cabinet is a multiple of six.

In a case where one of the first input power supply and the second input power supply supplies a two-phase voltage, and the other one of the first input power supply and the second input power supply supplies a three-phase voltage, the number of power supply units in the power supply cabinet is a multiple of twelve.

In an embodiment of the present disclosure, in order to achieve the balance between the power supplies of the two input power supplies using the at least two single-phase voltages, the connecting the power supply distributing unit to each of the at least two power supply units includes:

supplying the at least two single-phase voltages distributed by the power supply distributing unit to the power supply units through input ports of the same port type.

In an embodiment of the present disclosure, in order to achieve a normal operation of the device to be powered, the arranging the at least two power supply units in the power supply cabinet includes: arranging, in the power supply cabinet, power supply units with the number greater than the number of power supply units required by the device to be powered for a normal operation.

Hereinafter, the power supply method according to an embodiment of the present disclosure is described by taking a case where the first input power supply is a three-phase 380V alternating current power supply and the second input power supply is a single-phase 220V alternating current power supply as an example, as shown in FIG. 6, the method may include the following steps 601 to 610.

In step 601, power supply units are arranged in the power supply cabinet, the number of the power supply units is determined based on the number of phases of a power supply voltage supplied by each of the first input power supply and the second input power supply.

In a case where the first input power supply and the second input power supply supply power supply voltages with the same number of phases, the number of the power supply units in the power supply cabinet is at least twice the number of phases of the power supply voltage. For example, in a case where the first input power supply is a single-phase 220V alternating current power supply, and the second input power supply is a single-phase 240V direct current power supply, the number of power supply units in the power supply cabinet may be expressed by 2×2=4, or may be expressed by 3×2=6. If the device to be powered requires power supplies of six power supply units for a normal operation, the number of power supply units is determined to be six.

In a case where one of the first input power supply and the second input power supply supplies a single-phase voltage, and the other one of the first input power supply and the second input power supply supplies a two-phase voltage, the number of the power supply units in the power supply cabinet is a multiple of four. For example, in a case where one of the first input power supply and the second input power supply supplies a single-phase voltage, and the other one of the first input power supply and the second input power supply supplies a two-phase voltage, the number of power supply units in the power supply cabinet is 4, or 2×4=8. If the device to be powered requires the power supplies of eight power supply units for a normal operation, the number of the power supply units is determined to be eight.

In a case where one of the first input power supply and the second input power supply supplies a single-phase voltage, and the other one of the first input power supply and the second input power supply supplies a three-phase voltage, the number of the power supply units in the power supply cabinet is a multiple of six. For example, in a case where one of the first input power supply and the second input power supply supplies a single-phase voltage, and the other one of the first input power supply and the second input power supply supplies a three-phase voltage, the number of the power supply units in the power supply cabinet is 4, or 2×4=8. If the device to be powered requires the power supplies of twelve power supply units for a normal operation, the number of the power supply units is determined to be twelve.

In this embodiment, the first input power supply is a three-phase 380V alternating current power supply and supplies a three-phase voltage, and the second input power supply is a single-phase 220V alternating current power supply and supplies one single-phase voltage, the number of the power supply units in the power supply cabinet is a multiple of six. If the device to be powered requires the power supplies of six power supply units for a normal operation, the number of the power supply units is determined to be six, and the six power supply units are respectively represented by PSU1, PSU2, PSU3, PSU4, PSU5 and PSU6.

In addition, it can be seen that that in a case where one of the first input power supply and the second input power supply supplies a voltage with a different number of phases from the above number, the number of the power supply units may be determined according to the number determining manner in the above example and based on the power supply requirement of the device to be powered. In addition, each of the power supply unit includes two input ports, that is, a main input port and a backup input port, for receiving the supply voltages supplied by the first input power supply and the second input power supply.

In step 602, the at least two power supply units are divided into a first power supply group and a second power supply group.

The power supply units are divided into the first power supply group and the second power supply group based on the number of the power supply units determined in step 601. In this embodiment, the number of the power supply units determined in step 602 is six, the first power supply group includes three power supply units PSU1, PSU2 and PSU3, and the second power supply group also includes three power supply units PSU4, PSU5 and PSU6.

In step 603, the first input power supply, the second input power supply and each of the power supply units are connected to the power supply state monitoring unit.

In this embodiment, the first input power supply being a three-phase 380V alternating current power supply, the second input power supply being a single-phase 220V alternating current power supply, and each of the power supply units PSU1, PSU2, PSU3, PSU4, PSU5, PSU6 are connected to the power supply state monitoring unit.

In step 604, a connection manner of the first input power supply to the power supply units and a connection manner of the second input power supply to the power supply units are determined based on the determined number of single-phase voltages. In a case where the first input power supply supplies a multi-phase voltage and the second input power supply supplies a multi-phase voltage, the first input power supply and the second input power supply are connected to the power supply distributing unit.

In a case where each of the first input power supply and the second input power supply supplies a single-phase voltage, the first input power supply is connected to the main input port of each of the power supply units in the first power supply group and the backup input port of each of the power supply units in the second power supply group, and the second input power supply is connected to the backup input port of each of the power supply units in the first power supply group and the main input port of each of the power supply units in the second power supply group.

For example, the first input power supply is a 220V alternating current power supply, and the second input power supply is a 240V high voltage direct current power supply, each of the first input power supply and the second input power supply supplies a single-phase voltage. If each of the first power supply group and the second power supply group includes three power supply units, the first input power supply is connected to the main input port of each of the three power supply units in the first power supply group and the backup input port of each of the three power supply units in the second power supply group, the second input power supply is connected to the backup input port of each of the three power supply units in the first power supply group and the main input port of each of the three power supply units in the second power supply group.

In a case where the first input power supply supplies a single-phase voltage and the second input power supply supplies a power supply voltage with at least two phases, the first input power supply is connected to the main input port of each of the power supply units in the first power supply group and the backup input port of each of the power supply units in the second power supply group. The second input power supply is connected to the power supply distributing unit, and then is connected to the backup input port of each of the power supply units in the first power supply group and the main input port of each of the power supply units in the second power supply group.

For example, the first input power supply is a 220V alternating current power supply or a high voltage direct current power supply and supplies a single-phase voltage, and the second input power supply is a three-phase 380V alternating current power supply and supplies a three-phase voltage, if each of the first power supply group and the second power supply group includes three power supply units, the first input power supply is connected to the main input port of each of the three power supply units in the first power group and the backup input port of each of the three power supply units in the second power supply group. The second input power supply is connected to the power supply distributing unit, and then is connected to the backup input port of each of the power supply units in the first power supply group and the main input port of each of the power supply units in the second power supply group through the power supply distributing unit.

In a case where the first input power supply supplies a power supply voltage with at least two phases and the second input power supply supplies a single-phase voltage, the first input power supply is connected to the power supply distributing unit and then is connected to the main input port of each of the power supply units in the first power supply group and the backup input port of each of the power supply units in the second power supply group through the power supply distributing unit. The second input power supply is connected to the backup input port of each of the power supply units in the first power supply group and the main input port of each of the power supply units in the second power supply group.

In this embodiment, the first input power supply is a three-phase 380V alternating current power supply and supplies a three-phase voltage, the second input power supply is a single-phase 220V alternating current power supply and supplies a single-phase voltage, if it is determined in step 602 that each of the first power supply group and the second power supply group includes three power supply units, the three-phase 380V alternating current power supply is first connected to the power supply distributing unit, then is connected to the main input port A of each of the three power supply units PSU1, PSU2 and PSU3 in the first power supply group and the backup input port B of each of the three power supply units PSU4, PSU5 and PSU6 in the second power supply group through the power supply distributing unit. The second input power supply is a single-phase 220V alternating current power supply and is connected to the backup input port B of each of the power supply units PSU1, PSU2 and PSU3 in the first power supply group and the main input port A of each of the power supply units PSU4, PSU5 and PSU6 in the second power supply group.

In a case where each of the first input power supply and the second input power supply supplies a power supply voltage with at least two phases, the first input power supply is connected to the power supply distributing unit and then is connected to the main input port of each of the power supply units in the first power supply group and the backup input port of each of the power supply units in the second power supply group through the power supply distributing unit. The second input power supply is connected to the power supply distributing unit and then is connected to the backup input port of each of the power supply units in the first power supply group and the main input port of each of the power supply units in the second power supply group.

For example, each of the first input power supply and the second input power supply is a three-phase 380V alternating current power supply, each of the first power supply group and the second power supply group includes three power supply units. The first input power supply, that is, the three-phase 380V alternating current power supply is first connected to the power supply distributing unit, and then is connected to the main input port of each of the three power supply units in the first power supply group and the backup input port of each of the three power supply units in the second power supply group through the power supply distributing unit. The second input power supply, that is, the three-phase 380V alternating current power supply, is first connected to the power supply distributing unit, and then is connected to the backup input port of each of the three power supply units in the first power supply group and the main input port of each of the three power supply units in the second power supply group through the power supply distributing unit.

In step 605, all of the power supply units receive power supply voltages supplied by the first input power supply and the second input power supply.

In a case where each of the first input power supply and the second power supply supplies a single-phase voltage, the single-phase voltage supplied by the first input power supply is received by each of the power supply units in the first power supply group through the main input port and is received by each of the power supply units in the second power supply group through the backup input port. The single-phase voltage supplied by the second input power supply is received by each of the power supply units in the first power supply group through the backup input port and is received by each of the power supply units in the second power supply group through the main input port. For example, in a case where the first input power supply is a single-phase 220V alternating current power supply and the second input power supply is a 240V direct current power supply, since each of the first input power supply and the second input power supply supplies a single-phase voltage, the single-phase voltage supplied by each of the first input power supply and the second input power supply is supplied to target power supply units in the manner described above.

In a case where the first input power supply supplies a single-phase voltage and the second input power supply supplies a power supply voltage with at least two phases, the single-phase voltage supplied by the first input power supply is received by each of the power supply units in the first power supply group through the main input port and is received by each of the power supply units in the second power supply group through the backup input port. The power supply voltage with at least two phases supplied by the second input power supply is distributed by the power supply distributing unit into at least two single-voltages, the at least two single-voltages are received by the power supply units in the first power supply group through the backup input port successively in an alternating manner and are received by each of the power supply units in the second power supply group through the main input port.

In a case where the first input power supply supplies a power supply voltage with at least two phases and the second input power supply supplies a single-phase voltage, the power supply voltage with at least two phases supplied by the first input power supply is distributed into at least two single-phase voltages by the power supply distributing unit, the obtained at least two single-phase voltages are received by each of the power supply units in the first power supply group through the main input port and are received by each of the power supply units in the second power supply group through the backup input port. The single-phase voltage supplied by the second input power supply is received by each of the power supply units in the first power supply group through the backup input port and is received by each of the power supply units in the second power supply group through the main input port. As shown in FIG. 7, in the embodiment, the first input power supply is a three-phase 380V alternating current power supply and supplies a three-phase voltage, and the three-phase voltage is distributed by the power supply distributing unit into three 220V single-phase voltages, that is L1, L2 and L3, then the three single-phase voltages L1, L2, and L3 are respectively supplied to the main input ports of the power supply units PSU1, PSU2 and PSU3, and the backup input ports of the power supply units PSU4, PSU5 and PSU6. It is to be noted that the at least two single-phase voltages are supplied to input ports of the same port type. In this embodiment, the three single-phase voltages L1, L2 and L3 are supplied to the input ports of the same port type, and are successively supplied to the power supply units in an alternating manner. The second input power supply is a single-phase 220V alternating current power supply, the single-phase voltage supplied by the single-phase 220V alternating current power supply is received by each of the power supply units PSU1, PSU2 and PSU3 in the first power supply group through the backup input port B and is received by each of the power supply units PSU4, PSU5 and PSU6 in the second power supply group through the main input port A.

In addition, it can be seen that both the first input power supply and the second input power supply supply voltages to the power supply units. As shown in FIG. 7, six power supply units are arranged, such that 2×(5+1) redundant configurations may be achieved. In a case where one of the input power supplies operates abnormally, the power supply units receiving the voltage supplied by the input power supply in turn receives a voltage supplied by the other input power supply. That is, even if one of the input power supplies operates abnormally, the six power supply units are still be powered normally. In this case, the power supply units are arranged in a redundant manner while a redundant power supply manner of using a configuration of two power supplies is adopted, thereby achieving a more stable power supply.

In a case where each of the first input power supply and the second input power supply supplies a power supply voltage with at least two phases. The at least two single-phase voltage supplied by the first input power supply is distributed into at least two single-phase voltages by the power supply distributing unit, and the at least two single-phase voltages are received by each of the power supply units in the first power supply group through the main input port and are received by each of the power supply units in the second power supply group through the backup input port. The at least two single-phase voltage supplied by the second input power supply is distributed into at least two single-phase voltages by the power supply distributing unit, and the at least two single-phase voltages are received by the power supply units in the first power supply group through the backup input port and are received by the power supply units in the second power supply group through the main input port. For example, each of the first input power supply and the second input power supply is a three-phase 380V alternating current power supply and supplies a three-phase 380V voltage, the three-phase 380V voltage supplied by each of first input power supply and the second input power supply is distributed into three 220V single-phase voltages by the power supply distributing unit. The three 220V single-phase voltages are successively supplied to the power supply units as described above in an alternating manner. It is to be ensured that the input ports receiving the three single-phase voltages have the same port type.

In step 606, the power supply state monitoring unit monitors power supply states of the first input power supply and the second input power supply in real time.

In a case where the power supply state monitoring unit monitors that the first input power supply and the second input power supply operate normally, step 607 is performed. In a case where the power supply state monitoring unit monitors that the first input power supply operates abnormally, step 608 is performed. In a case where the power supply state monitoring unit monitors that the second input power supply operates abnormally, step 609 is performed.

In this embodiment, in a case where the power supply state monitoring unit monitors that the first input power supply, that is the three-phase 380V alternating current power supply, and the second input power supply, that is, the single-phase 220V alternating current power supply, operate normally, step 607 is performed. In a case where the power supply state monitoring unit monitors that the first input power supply, that is, the three-phase 380V alternating current power supply, operates abnormally, and the second input power supply, that is, the single-phase 220V alternating current power supply, operates normally, step 608 is performed. In a case where the power supply state monitoring unit monitors that the first input power supply, that is, the three-phase 380V alternating current power supply, operates normally, and the second input power supply, that is, the single-phase 220V alternating current power supply, operates abnormally, step 609 is performed.

In step 607, the power supply cabinet is controlled to receive power supply voltages supplied by the first input power supply and the second input power supply through the main input ports of all of the power supply units.

In this embodiment, in a case where it is monitored that the first input power supply, that is, the three-phase 380V alternating current power supply, and the second input power supply, that is, the single-phase 220V alternating current power supply, operate normally, the three-phase voltage supplied by the first input power supply is distributed into three single-phase voltages L1, L2 and L3 by the power supply distributing unit, the three single-phase voltages L1, L2 and L3 are respectively received by the three power supply units PSU1, PSU2 and PSU3 in the first power group through the main input port A and are respectively received by the three power supply units PSU4, PSU5 and PSU6 in the second power supply group through the main input port A.

In step 608, each of the power supply units in the first power supply group is controlled to receive the power supply voltage through the backup input port and each of the power supply units in the second power supply group is controlled to receive the power supply voltage through the main input port, to receive the power supply voltage supplied by the second input power supply.

In this embodiment, in a case where it is monitored that the first input power supply operate, that is, the three-phase 380V alternating current power supply, operates abnormally, each of the three power supply units PSU1, PSU2 and PSU3 in the first power supply group is controlled to receive the power supply voltage supplied by the second input power supply, that is, the single-phase 220V alternating current power supply, through the backup input port B, and each of the three power supply units PSU4, PSU5 and PSU6 in the second power supply group is controlled to receive the power supply voltage supplied by the second input power supply, that is, the single-phase 220V alternating current power supply, through the main input port A.

In step 609, each of the power supply units in the first power supply group is controlled to receive a power supply voltage through the main input port and each of the power supply units in the second power supply group is controlled to receive a power supply voltage through the backup input port, to receive the power supply voltage supplied by the first input power supply.

In this embodiment, in a case where the second input power supply, that is, the single-phase 220V alternating current power supply, operates abnormally, and the voltage supplied by the first input power supply is distributed into three single-phase voltages L1, L2 and L3 by the power supply distributing unit, each of the three power supply units PSU1, PSU2 and PSU3 in the first power supply group is controlled to receive the three single-phase voltages L1, L2 and L3 through the main input port A, and each of the three power supply units PSU3, PSU4 and PSU5 in the second power supply group is controlled to receive the three single-phase voltages L1, L2 and L3 through the main input port B.

In step 610, an external device is powered using the power supply voltages.

For example, the power supply units in the power supply cabinet supply power to an external server and a power supply system using the power supply voltages.

In summary, at least the following beneficial effects can be achieved with the embodiments of the present disclosure.

1. At least two power supply units are arranged in a power supply cabinet, and each of the power supply units includes a main input port and a backup input port. The power supply units are divided into two power supply groups, that is, a first power supply group and a second power supply group. The first input power supply is connected to the main input port of each of the power supply units in the first power supply group and the backup input port of each of the power supply units in the second power supply group. The second input power supply is connected to the backup input port of each of the power supply units in the first power supply group and the main input port of each of the power supply units in the second power supply group. In a case where it is determined that the first input power supply and the second input power supply operate normally, the power supply cabinet is controlled to receive power supply voltages supplied by the first input power supply and the second input power supply through the main input ports of all of the power supply units, and supply power to an external device to be powered using the power supply voltages. In a case where there are two input power supplies, each of the power supply units has two input ports. In a case where the two input power supplies operate normally, all of the power supply units are supplied by the two input power supplies, such that both the two input power supplies are in a power supply state, thereby achieving the balance between the power supplies of the two input power supplies.

2. In a case where one of the first input power supply and the second input power supply operates abnormally, each of the power supply units in the power supply cabinet is still powered normally using the power supply voltage supplied by the other one of the first input power supply and the second input power supply. In this way, in the redundant power supply manner of using the configuration of two input power supplies, even if one of the two input power supplies operates abnormally, all of the power supply units in the power supply cabinet can be powered normally, thereby achieving a stable power supply to the power supply cabinet.

3. In a case where one of the first input power supply and the second input power supply supplies a power supply voltage with at least two phases, or each of the first input power supply and the second input power supply supplies a power supply voltage with at least two phases, it is required to connect at least one of the first input power supply and the second input power supply supplying a power supply voltage with at least two phases to the power supply distributing unit in the power supply cabinet, to distribute the power supply voltage with at least two phases into at least two single-phase voltages, such that the power supply cabinet may be adapted to server rooms in various power supplied manners, and it is unnecessary to arrange a separate power distributing cabinet, thereby improving the efficiency of deployment of the server rooms.

4. In a case where at least one of the first input power supply and the second input power supply supplies a power supply voltage with at least two phases, it is required to determine the number of the power supply units in the power supply cabinet based on the number of phases of the power supply voltage, to ensure that with a redundant configuration of the power supply units, each of the at least two single-phase voltages obtained by distributing the power supply voltage with at least two phases can be supplied to a power supply unit, thereby avoiding the phase-missing, thus achieving the balance between the power supplies of the two input power supplies.

5. The at least two single-phase voltages distributed by the power supply distributing unit are supplied to the power supply units through input ports of the same port type, thereby achieving the balance between the power supplies.

6. The number of the power supply units in the power supply cabinet is greater than a number of power supply units required by the device to be powered for a normal operation, to ensure that the power supply voltage supplied by the power supply units can meet a requirement of the device to be powered for a normal operation, thereby achieving a stable operation of the device to be powered.

It is to be noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical factors in the process, method, article, or device that includes the elements.

It is to be understood by those skilled in the art that all or some of the steps for implementing the embodiments of the method described above may be achieved by means of hardware instructed by program instructions. The aforementioned program may be stored in a computer-readable storage medium, and when the program is executed, the steps including the embodiments of the method described above are executed. The above storage medium includes various medium that may store program codes, such as a ROM, a RAM, a magnetic disk or an optical disk.

It is to be noted that the above description only shows preferred embodiments of the present disclosure, which is only for explaining the technical solutions of the present disclosure and is not intended to limit the protection scope of the present disclosure. Any modification, equivalent substitution, and improvement made without departing from the spirit and principle of the present disclosure are included in the scope of present disclosure.

The invention claimed is:

1. A power supply system, comprising:
a power supply cabinet comprising at least two power supply units, wherein the at least two power supply units are divided into a first power supply group and a second power supply group, and each of the at least two power supply units comprises a main input port and a backup input port;
a first input power supply connected to the main input port of each of the power supply units in the first power supply group and the backup input port of each of the power supply units in the second power supply group; and
a second input power supply connected to the backup input port of each of the power supply units in the first power supply group and the main input port of each of the power supply units in the second power supply group, wherein
in a case where the first input power supply and the second input power supply operate normally, the power supply cabinet is configured to receive power supply voltages supplied by the first input power supply and the second input power supply through the main input ports of all of the power supply units, and supply power to an external device to be powered using the power supply voltages,
wherein the power supply cabinet further comprises a power supply state monitoring unit, wherein
the power supply state monitoring unit is connected to the first input power supply, the second input power supply and each of the at least two power supply units in the power supply cabinet, and
the power supply state monitoring unit is configured to: control each of the power supply units in the first power supply group to receive the power supply voltage through the backup input port and control each of the power supply units in the second power supply group to receive the power supply voltage through the main input port, in a case of monitoring that the first input power supply operates abnormally; and control each of the power supply units in the first power supply group to receive the power supply voltage through the main input port and control each of the power supply units in the second power supply group to receive the power supply voltage through the backup input port, in a case of monitoring that the second input power supply operates abnormally.

2. The power supply system according to claim 1, wherein the power supply cabinet further comprises a power supply distributing unit connected to each of the at least two power supply units, and wherein in a case where the first input power supply supplies a power supply voltage with at least two phases, the power supply distributing unit is connected to the first input power supply, and is configured to distribute the power supply voltage supplied by the first input power supply into at least two single-phase voltages, and in a case where the second input power supply supplies a power supply voltage with at least two phases, the power supply distributing unit is connected to the second input power supply, and is configured to distribute the power supply voltage supplied by the second input power supply into at least two single-phase voltages.

3. The power supply system according to claim 2, wherein the number of the power supply units in the power supply cabinet is related to the number of phases of a power supply voltage supplied by each of the first input power supply and the second input power supply, and wherein in a case where the first input power supply and the second input power supply supply power supply voltages with the same number of phases, the number of the power supply units in the power supply cabinet is at least twice the number of phases of the power supply voltage;

in a case where one of the first input power supply and the second input power supply supplies a single-phase voltage, and the other one of the first input power supply and the second input power supply supplies a two-phase voltage, the number of the power supply units in the power supply cabinet is a multiple of four;

in a case where one of the first input power supply and the second input power supply supplies a single-phase voltage, and the other one of the first input power supply and the second input power supply supplies a three-phase voltage, the number of the power supply units in the power supply cabinet is a multiple of six; and in a case where one of the first input power supply and the second input power supply supplies a two-phase voltage, and the other one of the first input power supply and the second input power supply supplies a three-phase voltage, the number of power supply units in the power supply cabinet is a multiple of twelve.

4. The power supply system according to claim 2, wherein the at least two single-phase voltages distributed by the power supply distributing unit are supplied to the power supply units through input ports of the same port type;

and/or the number of the power supply units is greater than the number of power supply units required by the device to be powered for a normal operation.

5. The power supply system according to claim 1, wherein the power supply cabinet further comprises a power supply distributing unit connected to each of the at least two power supply units, and wherein in a case where the first input power supply supplies a power supply voltage with at least two phases, the power supply distributing unit is connected to the first input power supply, and is configured to distribute the power supply voltage supplied by the first input power supply into at least two single-phase voltages, and in a case where the second input power supply supplies a power supply voltage with at least two phases, the power supply distributing unit is connected to the second input power supply, and is configured to distribute the power supply voltage supplied by the second input power supply into at least two single-phase voltages.

6. The power supply system according to claim 5, wherein the number of the power supply units in the power supply cabinet is related to the number of phases of a power supply voltage supplied by each of the first input power supply and the second input power supply, and wherein in a case where the first input power supply and the second input power supply supply power supply voltages with the same number of phases, the number of the power supply units in the power supply cabinet is at least twice the number of phases of the power supply voltage;

in a case where one of the first input power supply and the second input power supply supplies a single-phase voltage, and the other one of the first input power supply and the second input power supply supplies a two-phase voltage, the number of the power supply units in the power supply cabinet is a multiple of four;

in a case where one of the first input power supply and the second input power supply supplies a single-phase voltage, and the other one of the first input power supply and the second input power supply supplies a three-phase voltage, the number of the power supply units in the power supply cabinet is a multiple of six; and in a case where one of the first input power supply and the second input power supply supplies a two-phase voltage, and the other one of the first input power supply and the second input power supply supplies a three-phase voltage, the number of power supply units in the power supply cabinet is a multiple of twelve.

7. The power supply system according to claim 5, wherein the at least two single-phase voltages distributed by the power supply distributing unit are supplied to the power supply units through input ports of the same port type;

and/or the number of the power supply units is greater than the number of power supply units required by the device to be powered for a normal operation.

8. A power supply method, comprising:

arranging at least two power supply units in a power supply cabinet, wherein the at least two power supply units are divided into a first power supply group and a second power supply group, and each of the at least two power supply units comprises a main input port and a backup input port;

connecting a first input power supply to the main input port of each of the power supply units in the first power supply group and the backup input port of each of the power supply units in the second power supply group;

connecting a second input power supply to the backup input port of each of the power supply units in the first power supply group and the main input port of each of the power supply units in the second power supply group;

controlling the power supply cabinet to receive power supply voltages supplied by the first input power supply and the second input power supply through the main input ports of all of the power supply units, in a case where it is determined that the first input power supply and the second input power supply operate normally; and supplying power to an external device to be powered using the power supply voltages, wherein the method further comprises:

controlling each of the power supply units in the first power supply group to receive the power supply voltage through the backup input port and controlling each of the power supply units in the second power supply group to receive the power supply voltage through the main input port, in a case where it is monitored that the first input power supply operates abnormally; and controlling each of the power supply units in the first power supply group to receive the power supply voltage through the main input port and controlling each of the power supply units in the second power supply group to receive the power supply voltage through the backup input port, in a case where it is monitored that the second input power supply operates abnormally.

9. The power supply method according to claim 8, wherein in a case where the power supply cabinet further comprises a power supply distributing unit, the power supply method further comprises:

connecting the power supply distributing unit to each of the at least two power supply units;

connecting the power supply distributing unit to the first input power supply and distributing, by the power supply distributing unit, a power supply voltage supplied by the first input power supply into at least two single-phase voltages, in a case where it is determined that the first input power supply supplies a power supply voltage with at least two phases; and connecting the power supply distributing unit to the second input power supply and distributing, by the power supply distributing unit, a power supply voltage supplied by the second input power supply into at least two single-phase voltages, in a case where it is determined that the second input power supply supplies a power supply voltage with at least two phases.

10. The power supply method according to claim 9, wherein the arranging the at least two power supply units in the power supply cabinet comprises:

arranging, in the power supply cabinet, power supply units with the number related to the number of phases of a power supply voltage supplied by each of the first input power supply and the second input power supply, and in a case where the first input power supply and the second input power supply supply power supply voltages with the same number of phases, the number of the power supply units arranged in the power supply cabinet is at least twice the number of phases of the power supply voltage;

in a case where one of the first input power supply and the second input power supply supplies a single-phase voltage, and the other one of the first input power supply and the second input power supply supplies a two-phase voltage, the number of the power supply units arranged in the power supply cabinet is a multiple of four;

in a case where one of the first input power supply and the second input power supply supplies a single-phase voltage, and the other one of the first input power supply and the second input power supply supplies a three single-phase voltage, the number of the power supply units arranged in the power supply cabinet is a multiple of six; and in a case where one of the first input power supply and the second input power supply supplies a two-phase voltage, and the other one of the first input power supply and the second input power supply supplies a three-phase voltage, the number of power supply units arranged in the power supply cabinet is a multiple of twelve.

11. The power supply method according to claim 9, wherein the connecting the power supply distributing unit to each of the at least two power supply units comprises:

supplying the at least two single-phase voltages distributed by the power supply distributing unit to the power supply units through input ports of the same port type, and/or the arranging the at least two power supply units in the power supply cabinet comprises: arranging, in the power supply cabinet, power supply units with the number greater than the number of power supply units required by the device to be powered for a normal operation.

12. The power supply method according to claim 8, wherein in a case where the power supply cabinet further comprises a power supply distributing unit, the power supply method further comprises:

connecting the power supply distributing unit to each of the at least two power supply units;

connecting the power supply distributing unit to the first input power supply and distributing, by the power supply distributing unit, a power supply voltage supplied by the first input power supply into at least two single-phase voltages, in a case where it is determined that the first input power supply supplies a power supply voltage with at least two phases; and connecting the power supply distributing unit to the second input power supply and distributing, by the power supply distributing unit, a power supply voltage supplied by the second input power supply into at least two single-phase voltages, in a case where it is determined that the second input power supply supplies a power supply voltage with at least two phases.

13. The power supply method according to claim 12, wherein the arranging the at least two power supply units in the power supply cabinet comprises:

arranging, in the power supply cabinet, power supply units with the number related to the number of phases of a power supply voltage supplied by each of the first input power supply and the second input power supply, and in a case where the first input power supply and the second input power supply supply power supply voltages with the same number of phases, the number of the power supply units arranged in the power supply cabinet is at least twice the number of phases of the power supply voltage;

in a case where one of the first input power supply and the second input power supply supplies a single-phase voltage, and the other one of the first input power supply and the second input power supply supplies a two-phase voltage, the number of the power supply units arranged in the power supply cabinet is a multiple of four;

in a case where one of the first input power supply and the second input power supply supplies a single-phase voltage, and the other one of the first input power supply and the second input power supply supplies a three single-phase voltage, the number of the power supply units arranged in the power supply cabinet is a multiple of six; and in a case where one of the first input power supply and the second input power supply supplies a two-phase voltage, and the other one of the first input power supply and the second input power supply supplies a three-phase voltage, the number of power supply units arranged in the power supply cabinet is a multiple of twelve.

14. The power supply method according to claim 12, wherein the connecting the power supply distributing unit to each of the at least two power supply units comprises: supplying the at least two single-phase voltages distributed by the power supply distributing unit to the power supply units through input ports of the same port type, and/or the arranging the at least two power supply units in the power supply cabinet comprises:

arranging, in the power supply cabinet, power supply units with the number greater than the number of power supply units required by the device to be powered for a normal operation.

\* \* \* \* \*